(12) United States Patent
Gudia et al.

(10) Patent No.: US 12,548,056 B2
(45) Date of Patent: Feb. 10, 2026

(54) METHOD, COMPUTER-READABLE STORAGE MEDIUM, AND SYSTEM FOR ADAPTIVELY CONTROLLING SEARCH RECALL SET SIZES BASED ON QUERY ENTROPY

(71) Applicant: Maplebear Inc., San Francisco, CA (US)

(72) Inventors: Vinesh Reddy Gudia, South San Francisco, CA (US); Prakash Putta, Seattle, WA (US); Tejaswi Tenneti, San Carlos, CA (US); Prathyusha Bhaskar Karnam, Sunnyvale, CA (US)

(73) Assignee: Maplebear Inc., San Francisco, CA (US)

( * ) Notice: Subject to any disclaimer, the term of this patent is extended or adjusted under 35 U.S.C. 154(b) by 437 days.

(21) Appl. No.: 18/138,657

(22) Filed: Apr. 24, 2023

(65) Prior Publication Data
US 2024/0354825 A1     Oct. 24, 2024

(51) Int. Cl.
*G06Q 30/00* (2023.01)
*G06Q 10/083* (2023.01)
*G06Q 10/087* (2023.01)
*G06Q 30/0601* (2023.01)

(52) U.S. Cl.
CPC ....... *G06Q 30/0625* (2013.01); *G06Q 10/083* (2013.01); *G06Q 10/087* (2013.01); *G06Q 30/0635* (2013.01)

(58) Field of Classification Search
None
See application file for complete search history.

(56) References Cited

U.S. PATENT DOCUMENTS

| | | | |
|---|---|---|---|
| 8,370,319 B1* | 2/2013 | Krynski | G06F 16/24578 709/227 |
| 11,113,308 B1* | 9/2021 | Singh | G06F 16/24578 |
| 2008/0027913 A1* | 1/2008 | Chang | G06F 16/00 |
| 2010/0241507 A1* | 9/2010 | Quinn | G06Q 30/0256 705/14.42 |
| 2016/0321365 A1* | 11/2016 | Duan | G06F 16/3346 |
| 2018/0089325 A1* | 3/2018 | Yan | H04L 67/535 |
| 2022/0067055 A1* | 3/2022 | Zhu | G06Q 30/0631 |
| 2022/0092366 A1* | 3/2022 | Chiu | G06N 3/0464 |

OTHER PUBLICATIONS

Aslam, J.A., Yilmaz, E. and Pavlu, V., The maximum entropy method for analyzing retrieval measures, 2005, August, In Proceedings of the 28th annual international Acm Sigir conference on Research and development in information retrieval, pp. 27-34. (Year: 2005).*

* cited by examiner

*Primary Examiner* — Kelly S. Campen
*Assistant Examiner* — Brittany E Bargeon
(74) *Attorney, Agent, or Firm* — Fenwick & West LLP (57) ABSTRACT

A search module for an online concierge system executes searches in response to a search query with respect to item databases of retailers. The search module dynamically configures a recall set size that controls a number of search results returned for a search query based in part on a query entropy representing an estimated breadth of the search term. The query entropy may be determined relative to a diversity of items in a retailer's database. The recall set size may be configured relative to the query entropy in a manner that manages a tradeoff between latency of search execution and search result quality.

18 Claims, 3 Drawing Sheets

METHOD, COMPUTER-READABLE STORAGE MEDIUM, AND SYSTEM FOR ADAPTIVELY CONTROLLING SEARCH RECALL SET SIZES BASED ON QUERY ENTROPY

BACKGROUND

An online concierge system receives selections of items from customers, assigns an order to a picker to procure the items from a physical retailer, and facilitates delivery of those items from the picker to the customer. In such a system, a search function may be employed that enables customers to enter text-based search terms and generate search results of available items relevant to those terms. However, conventional search engines can be inefficient, thereby wasting computational power and introducing unwanted latency.

SUMMARY

An online concierge system includes a search module that executes searches with dynamically varying result set sizes. The search module obtains from a customer client device, a search query associated with an item database of a retailer participating in an online concierge system. The search module obtains a query entropy associated with the search query relative to the item database of the retailer. The query entropy represents an estimated breadth of the search query relative to a diversity of the item database. The search module determines a recall set size for the search query based on the query entropy. The search module executes the search query with respect to the item database of the retailer to generate a search result set using the recall set size to control a number of search results in the search result set. The search module outputs the search result set to the customer client device.

In one or more embodiments, the online concierge system may furthermore receive, in response to the search result set, a selection of one or more items from the search result set and add the one or more items to an order associated with the customer client device. The online concierge system may then facilitate procurement and delivery of the order from the retailer.

In one or more embodiments, obtaining the query entropy comprises obtaining historical data associated with historical search queries and historical conversions associated with the historical search queries, and computing the query entropy based on the historical data.

In one or more embodiments, obtaining the query entropy comprises obtaining respective item conversion counts of respective items for the search query, computing respective item entropies for the respective items as a function of the respective item conversion counts, and combining the respective item entropies to generate the query entropy.

In one or more embodiments, computing the respective item entropies comprises computing respective item conversion probabilities as respective ratios of the respective item conversion counts and a total conversion count representing a sum of the respective item conversion counts, and computing the respective item entropies as respective products of the respective item conversion probabilities and respective logarithmic functions of the respective item conversion probabilities.

In one or more embodiments, determining the recall set size comprises determining a maximum of a fixed threshold and dynamic threshold wherein the dynamic threshold is computed as a function of the query entropy.

In one or more embodiments, executing the search query comprises executing a multi-stage ranker that iteratively reduces and re-ranks stage-level search result sets at each of a set of ranking stages, wherein the recall set size controls the number of stage-level search results in at least one of the ranking stages.

In one or more embodiments, executing the multi-stage ranker comprises determining different recall set sizes respectively corresponding to the set of ranking stages.

In one or more embodiments, determining the different recall set sizes comprises determining respective dynamic thresholds for each of the set of ranking stages as respective products of a normalized query entropy and a scalable threshold, and determining for each of the set of ranking stages, respective maximums of respective fixed thresholds and the respective dynamic thresholds.

In one or more embodiments, determining the recall set size comprises applying a machine learning model to historical data of the online concierge system to estimate one or more parameters of a function for generating the recall set size, and applying the function to the query entropy using the one or more parameters.

In one or more embodiments, the machine learning model is trained to estimate the one or more parameters that optimize a reward metric relating to latency of executing the search query.

In further embodiments, a non-transitory computer-readable storage medium stores instructions executable by a processor for carrying out any of the processes described herein. Furthermore, a computer system may include a process and a non-transitory computer-readable storage medium as described herein.

DETAILED DESCRIPTION

A search module for an online concierge system executes searches in response to a search query with respect to item databases of retailers. The search module dynamically configures a recall set size that controls a number of search results returned for a search query based in part on a query entropy representing an estimated breadth of the search term. The query entropy may be determined relative to a diversity of items in a retailer's database. The recall set size may be configured relative to the query entropy in a manner that manages a tradeoff between latency of search execution and search result quality.

Figure 1:
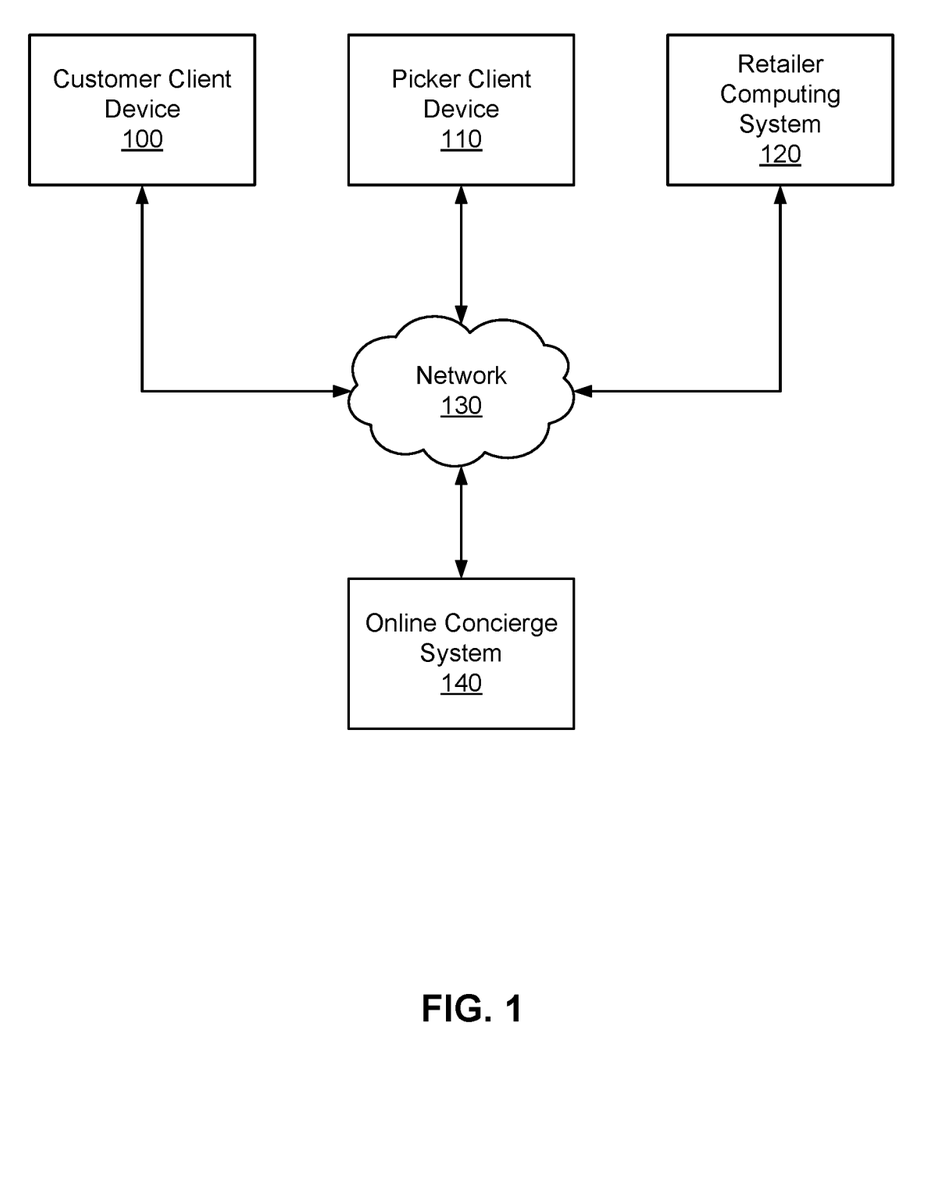
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." Searching may include browsing of items and/or entering text-based search queries executable by a search engine, as will be described further below. A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 may provide item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
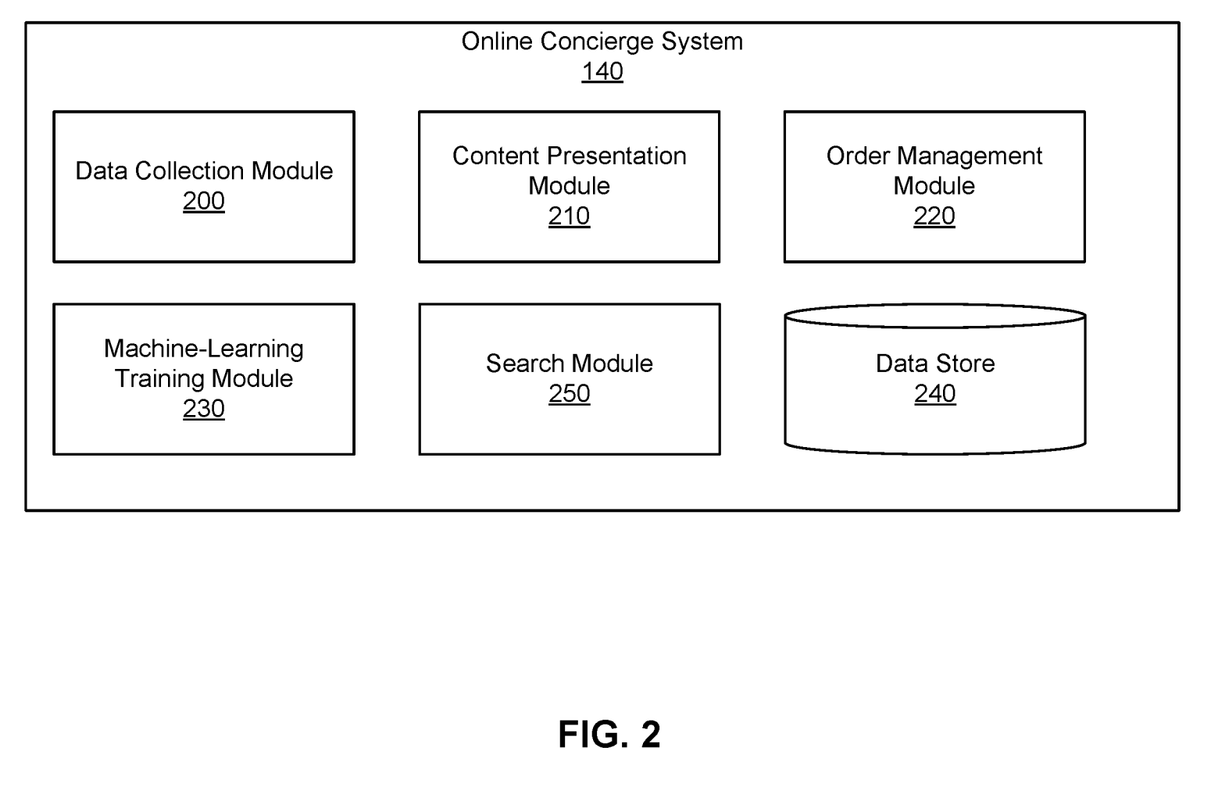
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140.

The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input.

For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The search module 250 facilitates searches in an item database of a retailer to generate a set of search results relevant to a search query entered via the customer client device 100. The search results may include links to relevant items for enabling access to further information about the items and/or adding the items to an order. The search module 250 may employ a search engine that operates in multiple stages to iteratively identify and rank search results. The number of search results may be iteratively reduced in each stage, with only the output of the final stage being output to the customer client device 100. Alternatively, a single stage search engine may be employed. As described above, the search module 250 may employ various techniques for customizing the search results to a specific user based on user characteristics, historical purchases, or other information.

As will be described in further detail below with respect to FIG. 3, the search module 250 may dynamically determine the number of recalled items for a search dependent on a query entropy representing a measure of broadness of the query's intent. Here, the number of search results may generally increase with increasing breadth of search. For example, a broad search such as "beverages" may yield a larger number of search results than a narrower search such as "Milkman's 2 gal fat free milk". Providing a larger number of search results for a broad search may beneficially ensure that the customer is able to review a sufficient number of items relevant to the search. In contrast, for a narrower search where only a relatively small number of items are likely to be of interest to the customer, returning a relatively smaller number of items avoids unnecessary use of computational power and reduces latency relative to a search yielding a larger number of results.

In one or more embodiments, the search module 250 may determine the query entropies for search terms on a per-retailer basis such that the broadness of the search term is evaluated relative to a diversity of the retailer's inventory. For example, a search for "snacks" in association with an item database of a home improvement store may reflect a relatively low query entropy because such a retailer may have only a few choices of snacks (e.g., available candy stocked at the checkout counter). In contrast, the same search in association with an item database of a grocery store may yield a relatively high query entropy because a grocery store may have a much higher number of items relevant to the query.

Figure 3:
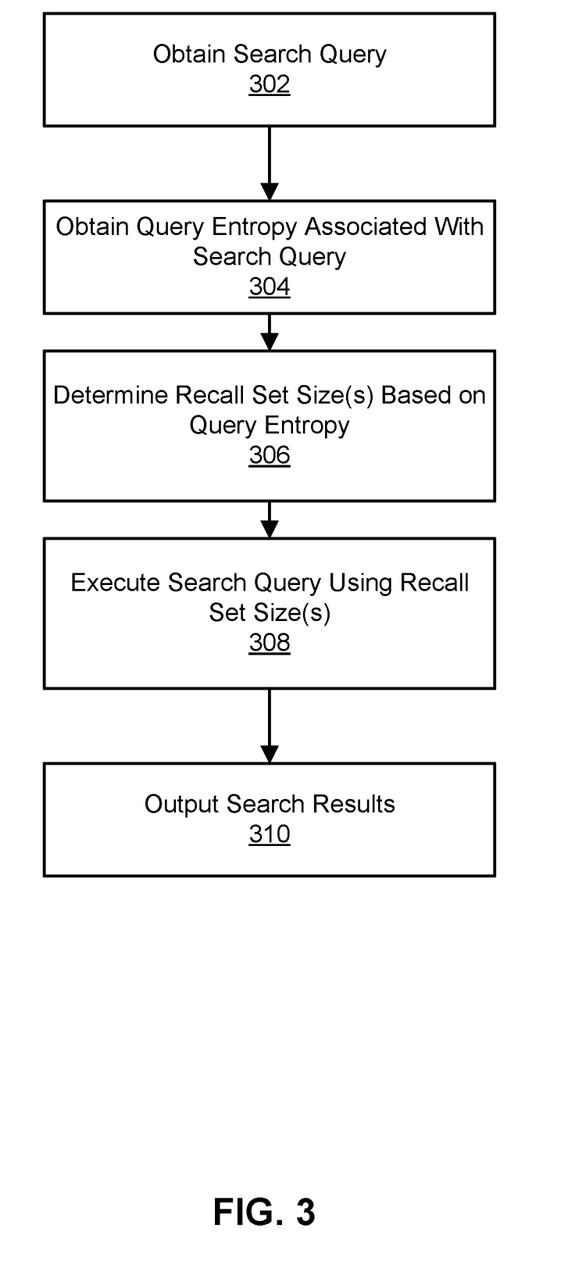
FIG. 3 is flow diagram of a process for executing a search in an online concierge system using an adaptive result set size based on query entropy, in accordance with one or more embodiments.

FIG. 3 is a flowchart for a method of executing a search query in association with an online concierge system 140, in accordance with some embodiments. Alternative embodiments may include more, fewer, or different steps from those illustrated in FIG. 3, and the steps may be performed in a different order from that illustrated in FIG. 3. At least some of the steps may be performed automatically by the online concierge system 140 without human intervention.

The search module 250 obtains 302 a search query from a customer client device 100. The search query may be associated with a specified retailer and may be executed with respect to an item database of items associated with the specified retailer. The search query may include one or more search terms entered by the user via the customer client device 100. Search terms may be relatively broad (e.g., "snacks") or may be relatively specific (e.g., "20 oz Potato Man's spicy barbecue potato chips baked").

The search module 350 obtains 304 a query entropy associated with the user search query as it relates to an item database of the retailer. The query entropy is a metric representing an estimated breadth of the search relative to a diversity of items available from a specific retailer. In one or more embodiments, the query entropy may be derived in part from the diversity of items that are observed or predicted to be associated with a conversion (i.e., a sale) in response to the user search query. For the same retailer, broad search queries will generally have relatively higher query entropies because there may be a wide range of items reasonably likely to result in a conversion (i.e., a sale) from the search. For example, a search for a broad term like "snacks" is reasonably likely to result in a conversion across a wide range of items including different types of snacks, different flavors, different brands, different sizes, etc. In contrast, a relatively narrow search query will generally have a relatively lower query entropy because only a relatively small number of search results are reasonably likely to result in a conversion. For example, for a narrow search like "20 oz Potato Man's spicy barbecue potato chips baked," only a single item or a small number of closely related items are likely to result in a conversion. The same search terms may result in different query entropies when searching different retailer item databases depending on the diversity of their respective inventories. For example, a search for "soap" may represent a relatively broad search with a high query entropy with respect to a large bath and beauty store (that stocks a wide range of soap products), while the same query may represent a relatively narrow search with a relatively lower query entropy when executed with respect to a small gift shop (that stocks only a few select soap products).

In one or more embodiments, the search module 250 may determine the query entropy based in part on historical data associated with historical search queries and historical conversions associated with those historical search queries with respect to a given retailer. For example, for a given search term, the search module 250 obtains data indicative of counts of historical conversions for each of a set of different items resulting from the search term as applied to the retailer item database. The query entropy may then be computed as a function of these counts.

In one or more embodiments, the query entropy may be computed as follows:

$$QE = -\sum_{pid} P(\text{term\_pid\_conversion}) \log P(\text{term\_pid\_conversion})$$

$$\text{where } P(\text{term\_pid\_conversion}) = \frac{\text{count(term, product\_id)}}{\text{count(term)}},$$

and where QE is the query entropy, pid is a unique item identifier for an item in the retailer database, count (term, product_id) is an item conversion count for a specific item resulting from the search term, and count (term) is a total count of conversions resulting from the search term. P (term_pid_conversion) thus represents an item conversion probability representing a likelihood that a conversion associated with the search term corresponds to the specific item pid. The overall term P (term_pid_conversion) log P (term_pid_conversion) represents an item entropy for a specific item, computed as a product of its item conversion probability and a log of the item conversion probability. The QE is computed as a sum of the item entropies over all unique items.

As an illustrative example of the above-described query entropy computation, simplified examples are explained below for a relatively narrow search term ("Potato Man's spicy barbecue potato chips baked"), an intermediate search term ("baked Potato Man's chips") and a relatively broad search term ("snacks").

In the first example, (term1="Potato Man's spicy barbecue potato chips baked"), two different items are identified in association with observed historical conversions having conversion counts, total count, and QE as follows:

ProductID_1:count(term1,ProductID_1)=100

ProductID_2:count(term1,ProductID_2)=125 count(term1)=225

QE=0.30

In the second example, (term2="baked Potato Man's chips"), four different items are identified in association with the observed historical conversions having respective conversion counts, total count, and QE as follows:

ProductID_1:count(term2,ProductID_1)=100

ProductID_2:count(term2,ProductID_2)=300

ProductID_3:count(term2,ProductID_3)=250

ProductID_4:count(term2,ProductID_4)=100 count(term2)=750

QE=0.55

In the third example, (term3="snacks") 50 different items are identified in association with estimated or observed historical conversions. Each item i has the same conversion count from which the total count and QE can be computed as follows:

ProductID_$i$:count(term3,ProductID_$i$)=100 count(term3)=5000

QE=1.7

As seen from these examples, the broader search term ("snacks") results in the largest query entropy (1.7), an intermediate search term ("Baked Potato Man's chips") results in a smaller query entropy (0.55), and the narrowest search term ("Potato Man's spicy barbecue potato chips baked") results in the smallest query entropy 0.30.

Additionally or alternatively, the search module 350 may predict the conversion probabilities P (term_pid_conversion) based in part on the historical data of the actual observed counts and based in part on other external factors. For example, the conversion probabilities may be further based in part on user characteristics, geographic considerations, timing of the query, or other factors that may affect conversion likelihood. Here, a different function may be utilized to compute the conversion probabilities that may incorporate additional parameters besides the historically observed conversion counts. In an example embodiment, a machine learning model may be trained and applied to predict the conversion probabilities instead of employing the above-described function.

In one or more embodiments, the search module 250 may precompute query entropies associated with specific search terms and store the search entropies to a lookup table indexed to the search terms. Upon receiving a search query, the search module 250 may perform a lookup in the lookup table to retrieve the query entropy associated with the received search term. If the lookup table does not include an entry for the search term, the search module 250 may then compute the query entropy as described above. Alternatively, the search module 250 may compute the query entropies directly each time a search query is received.

The search module 250 determines 306 a recall set size for the search query based at least in part on the query entropy. The recall set size represents a target count of search results to be returned responsive to the user search query. Here, the recall set size may generally be set higher for a higher query entropy (because a wider range of search results are likely to be of interest to the user and may be reasonably likely to result in conversions), and the recall set size may generally be set lower for a lower query entropy (because a narrower range of search results are likely to be of interest to the user and be reasonably likely to result in conversions). In embodiments where the search query is executed in multiple stages (as described further below), different recall set sizes may be set for each stage to iteratively narrow down the set of search results. For example, a first stage search may be executed to result in 1000 search results, a second stage search may reduce and re-rank the first stage search results to yield a result set of 300 search results, and a third stage search may reduce and re-rank the second stage search results to yield a result set of 200 search results.

In an example embodiment, a recall set size is determined as follows:

$$RSS = \max(minsize, z*QE/\propto)$$

where RSS is the recall set size, max is a maximum function, minsize is a fixed threshold size that operates as a minimum recall set size and the term $z*QE/\propto$ is a dynamic threshold computed as a function of the query entropy. Thus, the recall set size is set to the larger of the fixed threshold size and the dynamic threshold. In the above equation, the dynamic threshold is determined based on a scalable threshold z that gets scaled by a normalized query entropy (QE/$\propto$), where $\propto$ is a parameter representing a maximum possible query entropy.

As described above, the recall set size may be determined differently for different stages of a multi-stage ranker. Here, different stages may set different values for the fixed threshold size parameter (minsize) and/or the scalable threshold z, thereby resulting in different recall set sizes at different stages from the same query entropy. As described above, the parameters may be set to generally decrease the recall set size at each stage of the search ranking. For example, at least one of the fixed threshold and the scalable threshold may decrease at each stage.

In one or more embodiments, one or more parameters of the recall set size function (e.g., the fixed threshold minsize and/or the scalable threshold z) may be derived from applying a machine learning model to historical data that is trained to infer optimized parameters based on one or more reward metrics. The reward metric may be related to a latency associated with the execution of the search query. Furthermore, in some embodiments, the reward metric may further be based on a quality-based metric such as cart adds per search (CAPS), representing a number of items added to a shopping cart for each search. Additionally or alternatively, the reward metric may include one or more additional metrics representing a conversion rate associated with searches or other type of quality metric estimating quality of the search results. Here, the reward metric may generally be designed to optimize a tradeoff between reducing latency of search execution (which generally results from fewer search results) and achieving a high conversion rate (which generally results from providing at least a sufficient number of search results). For example, in one or more embodiments, a reward function may be given as: reward=−int ($\Delta$latency_in_ms/10)+10*int($\Delta$cart_adds_per_search_pct/ 0.1)

In this example, the reward metric increases by 1 for every 10 ms reduction in latency, while the reward metric decreases by 1 for every 0.1% decrease in CAPS. The parameters of the reward metric may be configurable to achieve different objectives. Moreover, other reward metrics may be used that have additional or different parameters.

The machine learning model may be trained to map a set of test parameters used to compute one or more recall set sizes to latency, conversions, or other metrics associated with those queries. The model is thus trained to infer which parameters yield results that optimize the reward metric. In one or more embodiments, the online concierge system 140 may be configured to execute at least some search queries using experimental test parameters that may be configured for the purpose of yielding historical data suitable for training the machine learning model. For example, some search queries may be randomly (or otherwise) selected for participation in an experiment in which experimental test parameters are applied. Results from these experiments may be used to update the machine learning model for future search queries.

In one or more embodiments, the search module 250 may precompute one or more recall set sizes associated with specific search terms and store the one or more recall set sizes to a lookup table indexed to the search terms. Upon receiving a search query, the search module 250 may perform a lookup in the lookup table to retrieve the relevant one or more recall set sizes associated with the received search term. In this embodiment, the search module 250 need not expressly determine the query entropy upon receiving the search query because the query entropy is already factored into the precomputed recall set size(s). If the lookup table does not include an entry for the search term, the search module 250 may then compute the one or more recall set sizes as described above. In other embodiments, the search module 250 may compute the one or more recall set sizes directly each time a search query is received.

The search module 250 executes 308 the search query with respect to the item database of the retailer to generate a search result set that utilizes the one or more recall set sizes to control a number of search results in the search result set. As described above, the search module may execute a search engine that employs multiple search and/or ranking stages that may iteratively reduce and re-rank the search results. Each stage of the search may utilize different recall set sizes (each computed as a different function of the query entropy) to achieve different numbers of search results. Various search algorithms may be applied to execute the search, which may differ between search stages.

The search module outputs 310 the search results. Based on the configured result set size relating to query entropy, the number of search results may dynamically vary depending on differing query entropies of different searches. Generally, narrow searches may yield fewer search results than broad searches. Limiting search results in this way may intelligently reduce computation power and latency associated with executing the search, and yield search results that may be better tailored to the user's intentions. The user may interact with the search results in various ways as described above. For example, the user may select a search result to view further details of an item and/or to add the item to an order.

ADDITIONAL CONSIDERATIONS

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
    obtaining from a customer client device, a search query associated with an item database of a retailer participating in an online concierge system that receives selections of items from the customer client device and facilitates procurement and delivery of the items from the retailer;
    obtaining a query entropy associated with the search query relative to the item database of the retailer, the query entropy representing an estimated breadth of the search query relative to a diversity of the item database;
    determining a recall set size for the search query based on the query entropy, wherein determining the recall set size comprises:
        applying a machine learning model to historical data of the online concierge system to estimate one or more parameters of a function for generating the recall set size, wherein the machine learning model is trained to estimate the one or more parameters that optimize a reward metric relating to latency of executing the search query; and
        applying the function to the query entropy using the one or more parameters;
    executing the search query with respect to the item database of the retailer to generate a search result set using the recall set size to control a number of search results in the search result set; and
    outputting the search result set to the customer client device.

2. The method of claim 1, further comprising:
    receiving, in response to the search result set, a selection of one or more items from the search result set;
    adding the one or more items to an order associated with the customer client device; and
    facilitating, via the online concierge system, procurement and delivery of the order from the retailer.

3. The method of claim 1, wherein obtaining the query entropy comprises:
    obtaining historical data associated with historical search queries and historical conversions associated with the historical search queries; and
    computing the query entropy based on the historical data.

4. The method of claim 1, wherein obtaining the query entropy comprises:
    obtaining respective item conversion counts of respective items for the search query;

computing respective item entropies for the respective
items as a function of the respective item conversion
counts; and
combining the respective item entropies to generate the
query entropy.

5. The method of claim 4, wherein computing the respective item entropies comprises:
computing respective item conversion probabilities as respective ratios of the respective item conversion counts and a total conversion count representing a sum of the respective item conversion counts; and
computing the respective item entropies as respective products of the respective item conversion probabilities and respective logarithmic functions of the respective item conversion probabilities.

6. The method of claim 1, wherein determining the recall set size comprises:
determining a maximum of a fixed threshold and dynamic threshold wherein the dynamic threshold is computed as a function of the query entropy.

7. The method of claim 1, wherein executing the search query comprises:
executing a multi-stage ranker that iteratively reduces and re-ranks stage-level search result sets at each of a set of ranking stages, wherein the recall set size controls a number of stage-level search results in at least one of the ranking stages.

8. The method of claim 7, wherein executing the multi-stage ranker comprises:
determining different recall set sizes respectively corresponding to the set of ranking stages.

9. The method of claim 8, wherein determining the different recall set sizes comprises:
determining respective dynamic thresholds for each of the set of ranking stages as respective products of a normalized query entropy and a scalable threshold; and
determining for each of the set of ranking stages, respective maximums of respective fixed thresholds and the respective dynamic thresholds.

10. A non-transitory computer-readable storage medium storing instructions executable by a processor for performing steps comprising:
obtaining from a customer client device, a search query associated with an item database of a retailer participating in an online concierge system that receives selections of items from the customer client device and facilitates procurement and delivery of the items from the retailer;
obtaining a query entropy associated with the search query relative to the item database of the retailer, the query entropy representing an estimated breadth of the search query relative to a diversity of the item database;
determining a recall set size for the search query based on the query entropy, wherein determining the recall set size comprises:
applying a machine learning model to historical data of the online concierge system to estimate one or more parameters of a function for generating the recall set size, wherein the machine learning model is trained to estimate the one or more parameters that optimize a reward metric relating to latency of executing the search query; and
applying the function to the query entropy using the one or more parameters;
executing the search query with respect to the item database of the retailer to generate a search result set using the recall set size to control a number of search results in the search result set; and
outputting the search result set to the customer client device.

11. The non-transitory computer-readable storage medium of claim 10, wherein the computer-readable storage medium further stores instructions that, when executed by the processor, cause the processor to perform steps comprising:
receiving, in response to the search result set, a selection of one or more items from the search result set;
adding the one or more items to an order associated with the customer client device; and
facilitating, via the online concierge system, procurement and delivery of the order from the retailer.

12. The non-transitory computer-readable storage medium of claim 10, wherein obtaining the query entropy comprises:
obtaining historical data associated with historical search queries and historical conversions associated with the historical search queries; and
computing the query entropy based on the historical data.

13. The non-transitory computer-readable storage medium of claim 10, wherein obtaining the query entropy comprises:
obtaining respective item conversion counts of respective items for the search query;
computing respective item entropies for the respective items as a function of the respective item conversion counts; and
combining the respective item entropies to generate the query entropy.

14. The non-transitory computer-readable storage medium of claim 13, wherein computing the respective item entropies comprises:
computing respective item conversion probabilities as respective ratios of the respective item conversion counts and a total conversion count representing a sum of the respective item conversion counts; and
computing the respective item entropies as respective products of the respective item conversion probabilities and respective logarithmic functions of the respective item conversion probabilities.

15. The non-transitory computer-readable storage medium of claim 10, wherein determining the recall set size comprises:
determining a maximum of a fixed threshold and dynamic threshold wherein the dynamic threshold is computed as a function of the query entropy.

16. The non-transitory computer-readable storage medium of claim 10, wherein executing the search query comprises:
executing a multi-stage ranker that iteratively reduces and re-ranks stage-level search result sets at each of a set of ranking stages, wherein the recall set size controls a number of stage-level search results in at least one of the ranking stages.

17. A computer system comprising:
a processor; and
a non-transitory computer-readable storage medium storing instructions executable by the processor for performing steps comprising:
obtaining from a customer client device, a search query associated with an item database of a retailer participating in an online concierge system that receives selections of items from the customer client device and facilitates procurement and delivery of the items from the retailer;

obtaining a query entropy associated with the search query relative to the item database of the retailer, the query entropy representing an estimated breadth of the search query relative to a diversity of the item database;

determining a recall set size for the search query based on the query entropy, wherein determining the recall set size comprises:

applying a machine learning model to historical data of the online concierge system to estimate one or more parameters of a function for generating the recall set size, wherein the machine learning model is trained to estimate the one or more parameters that optimize a reward metric relating to latency of executing the search query; and applying the function to the query entropy using the one or more parameters;

executing the search query with respect to the item database of the retailer to generate a search result set using the recall set size to control a number of search results in the search result set; and outputting the search result set to the customer client device.

18. The computer system of claim 17, wherein the computer-readable storage medium further stores instructions that, when executed by the processor, cause the processor to perform steps comprising:

receiving, in response to the search result set, a selection of one or more items from the search result set;

adding the one or more items to an order associated with the customer client device; and facilitating, via the online concierge system, procurement and delivery of the order from the retailer.

\* \* \* \* \*